W. S. Morris,
Fish Hook.
Nº 31,396. Patented Feb. 12, 1861.
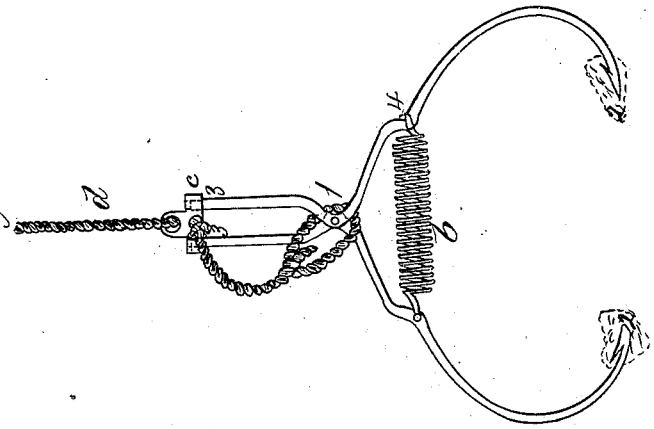
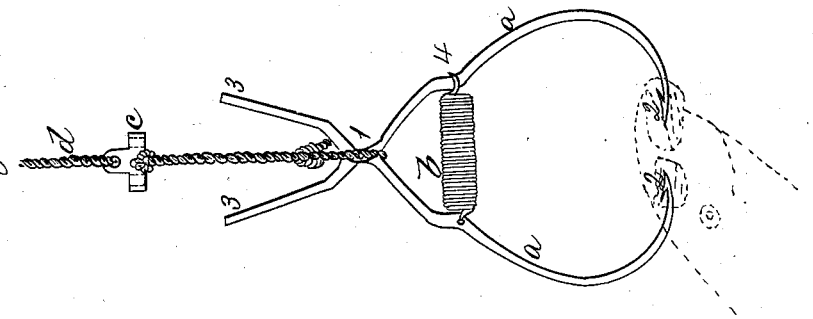
Witnesses
Lemuel W. Serrell
Chas H. Smith
Inventor
Wm S. Morris

UNITED STATES PATENT OFFICE.

WILLIAM S. MORRIS, OF NEW YORK, N. Y.

IMPROVEMENT IN FISH-HOOKS.

Specification forming part of Letters Patent No. 31,396, dated February 12, 1861.

*To all whom it may concern:*

Be it known that I, WILLIAM S. MORRIS, of the city and State of New York, have invented, made, and applied to use a certain new and useful Improvement in Spring Fish-Hooks; and I do hereby declare that the following is a full, clear, and exact description of the nature of said invention, reference being had to the annexed drawings, making part of this specification, wherein—

Figure 1 is an elevation of said hook as open, ready for catching a fish, and Fig. 2 represents said hook as discharged to catch a fish. Fig. 3 is a plan of the slide for keeping the hook set open.

Similar marks of reference denote the same parts.

The spring fish-hooks that have heretofore been constructed are more or less complicated or difficult to construct. Hence their price is high, and they are not adapted to general use by fishermen.

The nature of my said invention consists of a pair of hooks bent in a peculiar manner and jointed to each other, so that the upper ends, when compressed together, spread the hooks apart, and a slide attached to the string retains said hooks distended, but upon a fish biting at the bait on either hook said slide is drawn off by the string, and the hooks spring together and firmly retain the fish.

In the drawings, $a\ a$ are the shanks of the hooks, bent to the general form shown, so that they can be united by and turn on the rivet 1. $b$ is a spring tending to draw the hooks 2 2 toward each other, as seen in Fig. 2.

The upper parts of $a\ a$ are bent so that when the hooks 2 2 are near together the ends 3 3 are separated. If now the angler presses the ends 3 3 together, and places over them the slide $c$, the hooks will be spread apart, as in Fig. 1. This slide $c$ is formed hollow, or with holes, so as to set over the said ends 3 3, and is attached to the line $d$, so as to pull off said ends by the fish biting at the bait on either hook 2 2. The line $d$ passes down and is formed into a loop around the joint 1, so as to connect to said hooks, and the line is sufficiently slack at this point to allow the slide $c$ to draw off.

If a loop at one end of the spring $b$ enters a notch in the shank, as seen at 4, the loop on the end of said spring may be slid back to the rivet 1, so as not to strain the spring in disconnecting the hook from a fish.

My hook is very simple, easily constructed, durable, cheap, and efficient, and its great simplicity allows of its being sold at a price comparing favorably with the ordinary hook.

What I claim, and desire to secure by Letters Patent, is—

The slide $c$ upon the line $d$, in combination with the spring-hooks $a\ a$, that are hinged together, as set forth, so as to be spread apart by pressing the upper ends together and confining them by the slide $c$, as specified.

In witness whereof I have hereunto set my signature this 25th day of October, 1860.

WM. S. MORRIS.

Witnesses:
LEMUEL W. SERRELL,
CHAS. H. SMITH.